March 21, 1961 S. W. LEVINE 2,976,355
CARRIAGE DRIVE FOR SELECTIVE SIZE PHOTOELECTRIC
IMAGE REPRODUCING MACHINE
Original Filed Jan. 24, 1957 3 Sheets-Sheet 1

INVENTOR
S. W. LEVINE

BY Homer R. Montague
ATTORNEY

INVENTOR
S. W. LEVINE,
BY Homer R. Montague
ATTORNEY

March 21, 1961 S. W. LEVINE 2,976,355

CARRIAGE DRIVE FOR SELECTIVE SIZE PHOTOELECTRIC IMAGE REPRODUCING MACHINE

Original Filed Jan. 24, 1957 3 Sheets-Sheet 3

INVENTOR
S. W. LEVINE

BY Homer R. Montague
ATTORNEY

United States Patent Office 2,976,355

Patented Mar. 21, 1961

2,976,355

CARRIAGE DRIVE FOR SELECTIVE SIZE PHOTOELECTRIC IMAGE REPRODUCING MACHINE

Samuel W. Levine, Westbury, N.Y., assignor to Fairchild Camera & Instrument Corp., a corporation of Delaware Original application Jan. 24, 1957, Ser. No. 636,022. Divided and this application Oct. 13, 1958, Ser. No. 766,874

7 Claims. (Cl. 178—6.6)

This invention pertains to photoelectric image reproducing machines, and more particularly to machines of this type which are capable of producing from original line or continuous tone material, screened or half-tone reproductions either in the form of engraved relief plates for reproduction of the original subject matter by printing processes, or planographic half-tone reproductions without relief. In either case, the ability to change the size of the reproduction, for an original of given dimensions, contributes greatly to the utility of the machine in its application to the graphic arts or printing field, and the present invention relates to improvements specially directed to permitting selective size of the reproduction.

As has been indicated by the preceding description, the term "photoelectric engraving machine" is undly restrictive in that while such a machine may employ an engraving head for producing an engraved plate for direct printing or matting in the normal way of half-tone work, the identical machine may be used for producing a plate or sheet bearing an image only; i.e., a sheet comparable to a screened photograph. All that this involves is the substitution for the engraving head of a suitable light-valve type of output transducer operating upon a photosensitive plate, sheet or film to produce half-tone dots thereon in an order and of sizes dictated by the original by the original continuous tone or line material which is being duplicated. In this case, the sensitive material may be ordinary photographic plate or film stock, or it may be any of the photosensitive light-hardenable plastic materials capable of selective exposure to light and thereafter developed to produce a relief image. Where ordinary photographic materials are employed, the screened product of the "engraving" machine can be used as an intermediate or negative for later photographic printing exposure of conventional photoengraving plate materials for the production of direct or offset printing surfaces. In the latter case, the machines of the invention operate to combine the steps of size change and proper screen formation, and generally simplify and make more flexible and economical the operations heretofore required for the half-tone reproduction of continuous tone originals.

In view of what has been said, it will be understood that the use of the term "engraving" in connection with the machine described herein is not intended to exclude the production of purely planar half-tone images, the quoted term being adopted for brevity and because those skilled in the art generally understand the capabilities of the equipment itself for other than direct engraving operations.

For a complete understanding of the relationship of the present invention to previous developments along the same lines, reference is made to U.S. Reissue Patent No. 23,914 to John A. Boyajean, dated December 21, 1954. That patent dealt with an earlier form of photoelectric engraving machine which has been widely used for the production of engraved half-tone plates having the same scale or dimensions as the original subject matter, usually a photograph. To overcome the one-to-one scale limitation of that equipment, there was subsequently developed an enlarged and reducing engraving machine which is the subject matter of pending U.S. patent application Serial No. 428,606, filed May 10, 1954 in the name of F. P. Willcox and others, now U.S. Patent No. 2,875,275, granted Feb. 24, 1959 which describes and claims a somewhat similar machine permitting the necessary adjustments to produce such reproductions on any desired dimensional scale, with appropriate provisions for proper spacing and size of the half-tone dots making up the reproduction. A subsequent U.S. patent application, Serial No. 602,013, filed August 3, 1956 in the name of F. P. Willcox and R. N. Hotchkiss disclosed further improvements and simplifications in the optical scanning system of the aforementioned application Serial No. 428,606.

Reference is also made to the U.S. patent application in the name of S. W. Levine, Serial No. 455,117, filed September 10, 1954, now U.S. Patent No. 2,882,792 granted April 21, 1959 dealing with an optical output transducer which, when utilized in place of the engraving output head of the Boyajean patent or similar devices, is capable of producing half-tone dot arrays according to the distribution of light and shade in an image of original subject matter, to produce a photographic, photopolymer or similar reproduction of the original as a screened image. All of the applications (and the patent) referred to above are owned by the assignee of the present invention.

In describing the structure and arrangement of the present invention, which does not in any way depend for its essential novelty upon those prior disclosures, reference will be made to them for additional details of features indicated more generally herein, these references making it possible for those interested to refer to the earlier work if desired for information as to the specific details of those and releated inventions.

It is a principal object of the present invention to provide a greatly simplified construction of the entire mechanism providing for selective size ratios as between the original and the final reproduction, and one using mechanical parts which can be fabricated at reasonable cost, without any sacrifice of precision. More specifically, the invention provides a design in which the amount of toothed-wheel gearing is greatly reduced, and in which the elements are employed only where their unavoidable eccentricities and random or periodic errors cause least harm in the quality of the reproduction. The design also eliminates dependence upon lead screws for the longitudinal drives of the moving parts, and provides a selective drive ratio which can be continuously (as opposed to step-wise) adjusted without the complication of geared transmissions.

The use of lead screws for driving a carriage parallel to the axis of a sheet-carrying cylinder has been the ususal system in engraving, facsimile and similar machines requiring such carriage motion. Accurate lead screws are very expensive, particularly suitable lengths, and even if initially almost perfect, they lose precision steadily as a result of wear of the thread. Moreover, what is usually actually wanted in the finished sheet (after it is unwrapped from the carrying cylinder) is exposure lines or dot lines parallel to one sheet margin; the lead screw produces a continuous motion of the carriage during cylinder rotation, and hence the exposure lines are actually sections of a helix, and will be inclined to the sheet margin when it is again returned to flat form.

A further objection to the lead screw drive, and indeed to any drive employing toothed wheel gearing, is that cyclic repetitive errors in dot position are produced, which are often quite noticeable and objectionable. The system of the present invention completely eliminates such periodic fluctuations.

As in all machines intended for the production of half-tone or screened reproductions, the present invention also includes means for modulating the signals derived from the original copy, and after amplification fed into the engraving head or other output transducer, so that the signals are interrupted at the proper intervals to produce the desired series of discrete dots in the finished product, sheet or plate. This modulation is preferably an electrical signal whose frequency changes only when the screen size, expressed in dots per square inch or the like, is changed, and is otherwise independent of the signals passing through the machine. Its actual function is to override the picture signals at the proper intervals so that no penetration of the engraving stylus occurs except where a dot of signal-controlled size is to be produced, or no luminous output is produced by an optical output transducer.

A preferred form of such screen tone generator forms the subject matter of the copending application of Samuel W. Levine, Serial No. 636,022, filed January 24, 1957, of which application the present application is a division. Such screen tone generator is characterized by low cost, good precision of dot placement, and provision for selection of accurately defined dot frequencies of several different rates, as required for a machine having a wide range of enlargement and reduction ratios. This generator is also advantageous in that the signals produced thereby are relatively free from both amplitude and phase-modulation distortion. It utilizes an optically produced tone wheel interrupting a beam of light, and includes special provision whereby the beam is always simultaneously interrupted by several dots of opaque and transparent areas, so that local errors in placement of these areas are averaged out to obtain good precision in the output signal.

The above and other objects and advantages of the invention will be better understood by referring now to the following detailed specification of a preferred machine embodying the noted improvements, and the accompanying drawings, in which:

Figs. 2 and 3 can be aligned along their common margin to provide a single perspective view of the essential parts of the entire apparatus.

Figure 1:
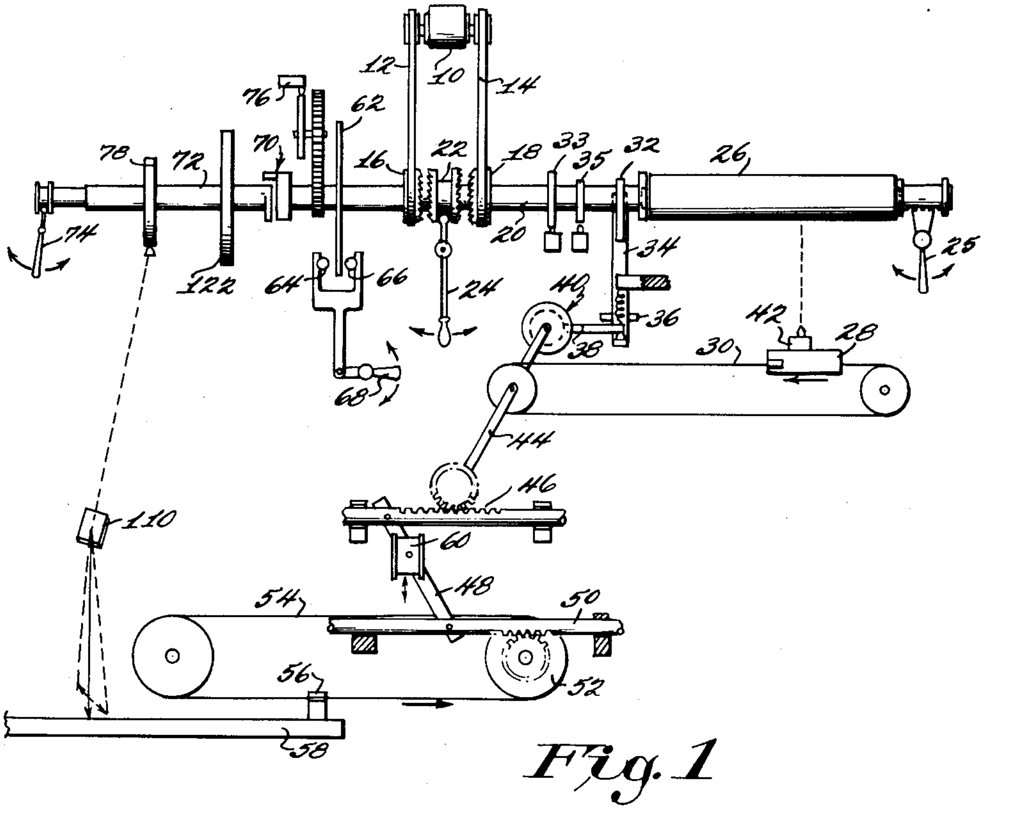
Fig. 1 is a schematic lay-out of the complete machine, details being suppressed for clarity of the general organization.

The novel aspects of the present invention can be advantageously utilized in machines of the general type indicated herein, whether such machines are of the same-size type, or in the alternative are provided with means for producing enlarged or reduced reproductions. Thus, such improvements are applicable to a machine of the type shown in the Boyajean patent mentioned above. However, for purposes of the present disclosure, the improvements are shown as they are applied to the later machine including provision for enlarging and reducing the reproduction, as shown and described in the Willcox and Hotchkiss application also mentioned hereinabove.

In accordance with the general arrangement of the Willcox and Hotchkiss application mentioned above, the present machine includes a main drive motor for turning the cylinder about which is wrapped a plastic or metal sheet to be engraved, or a photosensitive sheet which is to be exposed to a dot pattern for later processing to produce a half-tone reproduction. The cylinder turns continuously at a fixed rate which is, however, adjustable in advance to establish a given spacing between the dots, or for other purposes. The ends of the wrapped sheet are secured to the rotating cylinder by a clamp, and in the region of this clamp there occurs a dead area (corresponding to the sheet margins) during the passage of which past the engraving or exposing transducer, certain machine functions are accomplished. These include the advancing of the transducer carriage a short distance along its guide rail or rails parallel to the cylinder axis, in preparation for the next line of engraved or exposed dots on the sheet, and the advancing of the copy being scanned in preparation for the scanning of the next succeeding line thereof.

The main drive motor also drives a rotary cam which turns in synchronism with the cylinder shaft, and bears against a follower arm which is thus oscillated back and forth during each rotation of the cylinder. A portion of the follower arm engages a second arm which is rotatable through a small angle, and whose oscillations are transmitted through a clutch when motion is to be transmitted to the other parts. The motions of this second arm, when the clutch is engaged, are transmitted to a flexible but inextensible belt one pass of which is parallel to the cylinder axis, and to which the axially-movable carriage is fixedly connected. Periodic movements of this second arm thus periodically advance the belt and carriage, and the clutch operates in timed relation to a brake to ensure that belt motion always occurs in the same direction (along the direction of the cylinder axis) during the engraving or exposing of the sheet, so that the carriage moves progressively along the cylinder. The clutch and brake are of the electromagnetic type energized at proper times by switches controlled by cams on the cylinder shaft, so that carriage advance is restricted to periods when the cylinder clamp area is passing beneath the transducer.

The arrangement described completely eliminates the conventional lead screw drive for carriage motions, with important advantages including lowered cost, maintenance of position on the sheet with lowered machine tolerances and selection of line-advance per revolution without gear changing and over a complete range rather than in discrete steps. Periodic errors in the lead screw are eliminated, as is the necessity for exact parallelism between the cylinder axis and the carriage path. Moreover, since carriage advance always occurs while the dead area of the cylinder is passing the transducer, the lines of dots are circles perpendicular to the cylinder axis and not sections of a helix. The lines on the sheet are thus parallel to its edges.

It has been said above that the oscillating motion of the second arm produces the step-wise motion of the transducer carriage. The same motion of the second arm also produces the rectilinear step-wise motion of the sliding table carrying the original copy being scanned to provide the control signals for the engraving or exposing transducer. This step-wise motion is controlled by the same magnetic clutch and brake, so that movement of the copy table also occurs only when the clamp or dead area of the sheet cylinder is passing under the transducer. The amount of copy table motion obtained for each revolution of the cylinder is controllable smoothly through a desired range of values.

The earlier Willcox et al. application, Serial No. 428,606 included a magnetic record tone wheel driven by the cylinder shaft, and having several different tone tracks for producing the on-off modulation of the signals fed to the engraving transducer. These signals produced the desired discrete dot pattern in the final reproduction, and hence are referred to as the screen frequency signals.

The screen frequency generator employed in the preferred form of the apparatus of the present invention is fully disclosed and claimed in the aforementioned copending Levine application of which the present application is a division, and is of an optical type utilizing one or more simple photocells energized by a light beam passing in turn through a tone wheel having rings formed of alternating opaque and transparent portions, and a relatively stationary mask bearing the same pattern. The wheel and mask constitute a light chopper which provides a photocell output of the desired shape and frequency for producing the required on-off modulation of the transducer output. By providing the tone wheel with several different radially spaced patterns or rings, and providing the mask with similar sections, a selection of output frequencies is readily achieved. The light source and cell assembly can be moved radially to accomplish this selection, or several photocells can be employed at the respective radial positions, and the output taken from any desired cell by suitable switch selection.

In the finished sheet or engraving, the half-tone dots of successive lines are staggered relative to one another, as is well known in the engraving art. For engravings to be reproduced in black and white or any single color, the stagger between lines amounts to one-half the dot spacing, producing a true diagonal pattern. While this stagger can be reproduced by mechanical means in the machine, it is much simpler to achieve it by producing a phase shift of the necessary amount in the screen frequency signal, as between successive line scans. In the aforementioned application Serial No. 428,606, a phase shift of one-half the dot spacing was achieved by providing multiple magnetic pickup heads and switching the outputs at the required times. The optical tone wheel source of the present invention produces a perfectly symmetrical signal whose phase position can readily be altered by purely electronic means or by switching between transformer windings. It thus provides for the possibility of selection not only of a half dot space stagger, but for any selected stagger as between successive lines, and for ready selection of the stagger as amongst several different engraved sheets. The latter facility is of special importance where color separation engravings are to be produced by successive reproductions of a single original, in that, in terms of conventional engraving, any desired screen pattern rotations can be selected for the different color plates.

Fig. 1 of the drawings illustrates the major parts of a complete machine, and indicates their operative relationships for ready understanding of the broader aspects of the invention. Details of certain of the parts will be furnished hereinafter, like parts being similarly numbered for easy reference.

In Fig. 1, numeral 10 designates a main drive motor having two pulleys connected as by belts 12 and 14 to driven pulleys 16 and 18 of different diameters. These driven pulleys are loose upon a shaft 20, and are provided with drive teeth for selective engagement with mating teeth on opposite radial faces of a shiftable drive wheel 22 rotationally coupled to the shaft but splined for axial motion. A hand lever 24 controls which of pulleys 16 and 18 has its drive teeth engaged with wheel 22, and hence controls the speed of shaft 20. The shaft is coupled to a cylinder 26 adapted to carry the engraveable or light sensitive sheet, and the cylinder therefore rotates at the selected speed when the hand lever 24 is moved away from its central position. A hand lever 25 permits removal of cylinder 26 from its connection to shaft 20.

A carriage 28 is slidable on ways parallel to the cylinder axis, being moved step-by-step by reason of its connection to a flexible inextensible tape or belt 30. A cam 32 on shaft 20 oscillates a follower lever 34, pivoted at 36, the lower bent end of lever 34 pressing through a rigid connection a second lever 38 connected to oscillate, in turn, a portion of a clutch and brake assembly 40. As will be explained below, the clutch and brake are so controlled that this oscillating motion is periodically applied, in one direction only, to the tape 30 to cause carriage 28 to progress stepwise along the cylinder 26, motion taking place only when the cylinder is in such a rotational position that the marginal or clamped portions of the sheet carried thereby are beneath the transducer 42 on the carriage. Cams 33 and 35 operate switches thus to control the clutch and brake.

Motion derived from clutch and brake assembly 40 is also conveyed as by a connection 44 to a gear and rack 46 to provide stepwise advances of the rack at the same intervals. A link 48 connects the rack 46 to a second rack 50 driving a gear and a pulley 52 controlling the motion of another flexible, inextensible belt 54 connected as at 56 to the slidable copy table 58. The pivot or fulcrum of link 48 is adjustable by reason of the fact that the pivot is on a movable carriage 60 whose lateral position can be manually adjusted to select the amount of table travel obtained for each rotation of shaft 20 and cylinder 26.

Shaft 20 extends also to the other side of drive wheel 22, and there carries the optical tone wheel 62 cooperating with the light source 64 and photocell 66 shown as positionable, by hand lever 68, in any desired radial position with respect to the tone wheel. A geared cam and switch 76 provide for phase selection as to the output from the tone wheel 62, to produce dot stagger between successive lines of dots on the reproduction sheet.

A coupling 70 permits a shaft 72 to be disengaged from shaft 20 when it is desired to scan a particular copy region as in adjusting the machine in preparation for making a reproduction, but the coupling, disengageable by hand lever 74, is always engaged during operation of the machine. Shaft 72, when rotated, turns the cam 78 which controls the motion of the optical scanner which analyzes the original material of "copy" line by line in a manner already fully described in application Serial No. 428,606 mentioned above. The scanner mechanism will not further be described herein, since its details form no essential part of the present invention.

Figure 2:
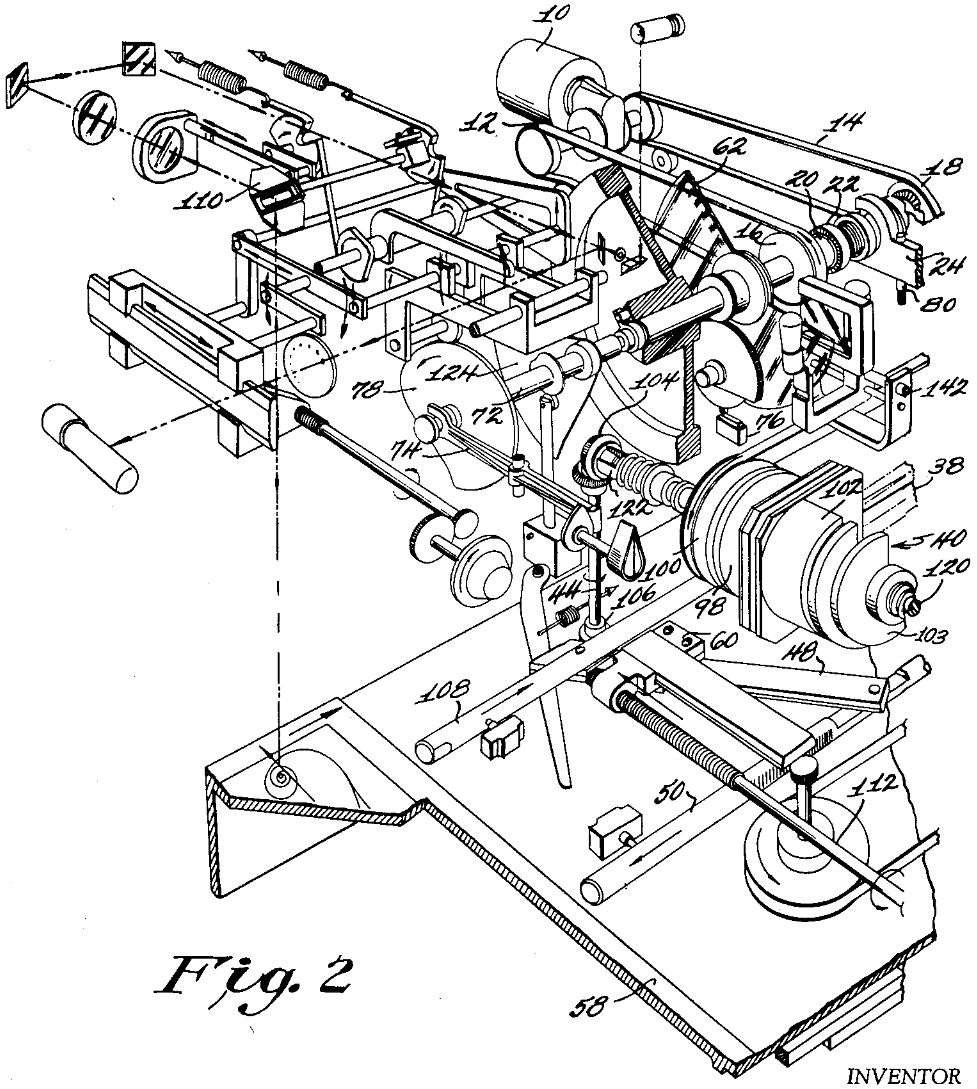
Fig. 2 is a partial perspective view of the complete apparatus, showing the basic elements of a part of Fig. 1 but in greater detail.
Figure 3:
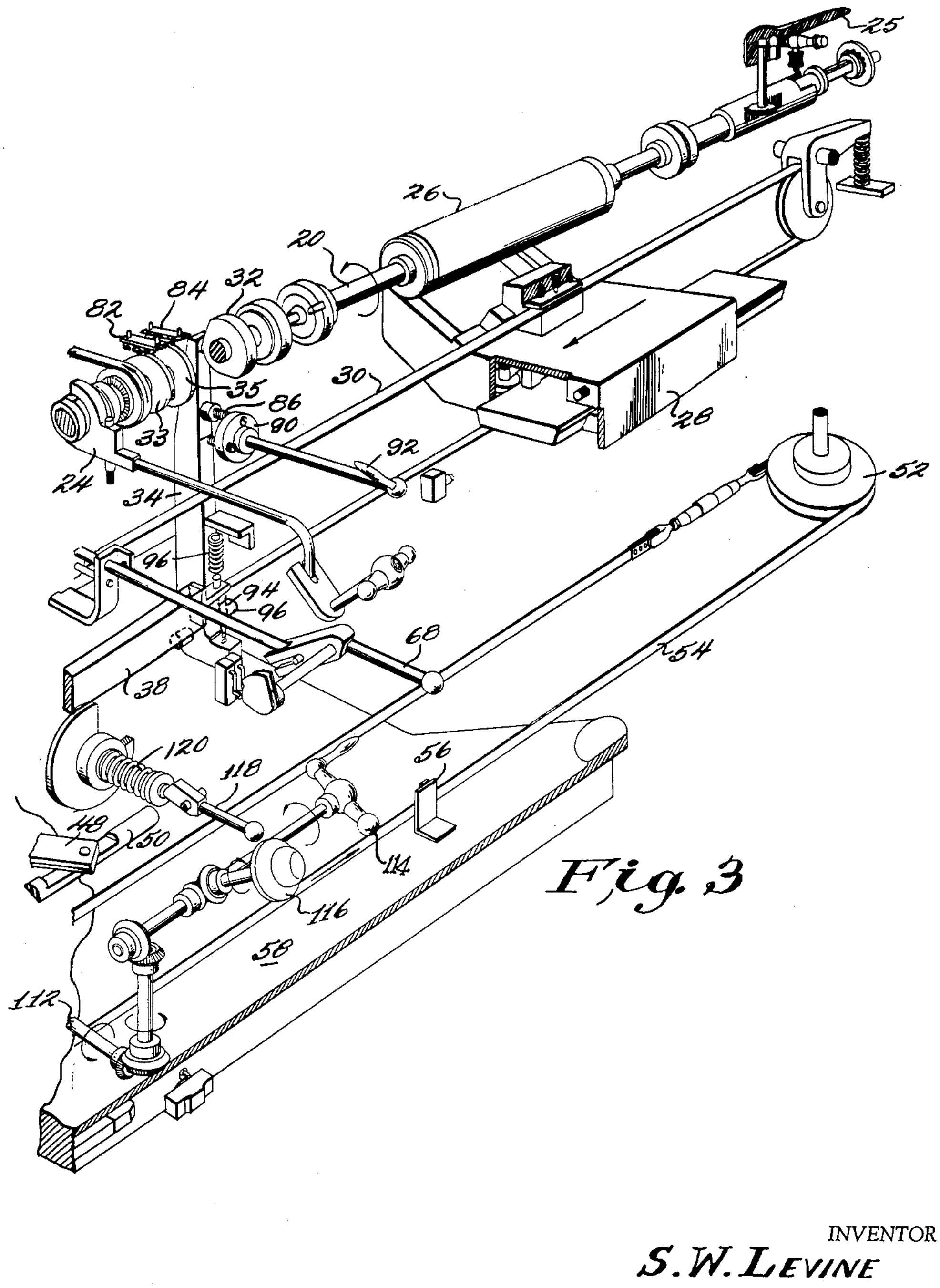
Fig. 3 is a view similar to Fig. 2 of the remaining part of Fig. 1, again in greater detail.

With the above general description in mind, the constructional details can readily be followed in Figs. 2 and 3, which taken together show the complete machine as above described. To permit a legible scale, Figs. 2 and 3 have been placed on separate sheets, which can readily be assembled together for a complete view.

Fig. 2 shows the drive motor 10 and belts 12 and 14, as well as pulley 16, a portion of pulley 18, and toothed drive wheel 22 and its control rod 24 pivoted at 80. To follow the general order of description employed in Fig. 1, the reader should now turn to Fig. 3, which illustrates the right hand part of shaft 20, the clutch cam 33 and its switch 82, brake cam 35 and its switch 84, the step advance cam 32, and cylinder 26 with its associated parts. Follower lever 34 is here shown as cooperating with position stops, of which one is designated 86, mounted on a turret 90 controlled by hand lever 92 to select the amount of oscillation of lever 34 and hence the magnitude of each step of the carriage travel.

Fig. 3 further illustrates the connection between first lever 34 and second lever 38, comprising a push rod 94 between the bottom leg of L-shaped lever 34 and the end of lever 38. A compression spring 96 urges lever 38 in the clockwise direction (the spring bearing against a fixed part of the machine frame), except when lever 38 is raised (counter-clockwise) by lever 34 driven from cam 32. The hand control 92 selects a desired stop 86 to establish the forward travel limit of 34, and hence controls the amount of travel of carriage 28 for each rotation of the cylinder 26, and thereby the fineness or coarseness of the screen in one direction; namely the direction of carriage travel. The fineness of screen in the perpendicular direction will be selected by the frequency of the tone or screen signals with which the photocell signals are modulated.

So far, the means by which rotation of the cylinder shaft rotates second lever 38 a small amount for each shaft rotation has been described. Referring now again to Fig. 2, lever 38 is fixed to and rotates the housing 98 of a conventional magnetic clutch, which when energized, clutches to the belt pulley 100 and hence drives the belt pulley a slight amount counter-clockwise, as indicated by the arrow on belt 30, each time lever 38 is raised. A conventional magnetic brake 102 is secured to the machine frame and, when energized, holds the belt pulley stationary because the movable plate 103 of the brake is connected through a hollow shaft (not shown) to the belt pulley 100. The switches 82 and 84 of Fig. 3 are connected to control the brake and clutch so that whenever the clutch is de-energized, the brake is energized. Thus all retrograde motion of the belt pulley is absolutely prevented, and the parts are maintained in a stressed condition, just as in the case of a lead screw drive, to eliminate errors due to looseness or play.

Figure 4:
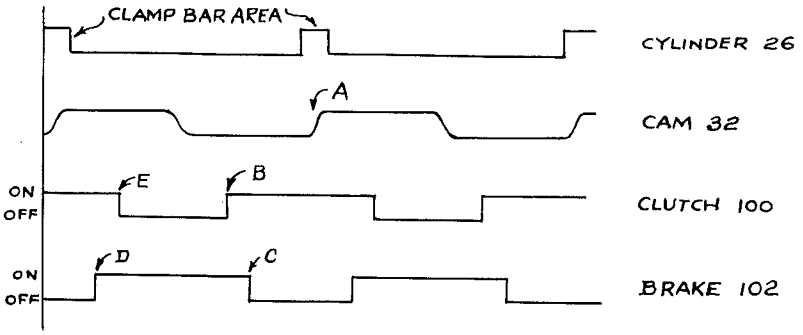
Fig. 4 is a graphical representation of the relationship among cylinder rotation, carriage advance cam position, and clutch and brake energization.

Fig. 4 shows graphically the time relationship between the cylinder rotation, the position of advance cam 32, and the energization of the clutch and brake. It will be seen that the advance cam raises lever 38 (via lever 34) only during passage of the cylinder clamp area past the transducer, as indicated at "A", and that clutch 100 is energized as at "B" well in advance of this time. Moreover, the brake 102 is de-energized (point "C" somewhat in advance of the arrival of the clamp bar area at the transducer. The reason for the energization of the brake and clutch ahead of the instants corresponding to carriage travel is that in this way the magnetic flux build-up times of these elements are rendered immaterial. The clutch is energized well ahead of the commencement of rotation of lever 38 (point "B"), and the brake is energized well ahead (point "D") of the turning off of current to the clutch, at point "E."

The longitudinal drive for the copy table 58 is also obtained from the shaft of belt pulley 100, through miter gearing 104, shaft 44, pinion 106 and rack 108. The latter is connected to secondary rack 50 by the link 48 forming a variable ratio lever. The ends of link 48 are pivoted to the respective racks, and its fulcrum is fixed upon carriage 60 suitably guided on ways and positioned by a lead screw and the manually controlled shaft 112. The gearing for controlling shaft 112 is shown in Fig. 3, terminating in hand wheel 114, with various intermediate gears and a ratio indicator dial 116. This arrangement permits precise adjustment of the amount of advance of the copy table 58 for each rotation of the cylinder, and hence controls the degree of enlargement or reduction in that direction. Enlargement and reduction control in the perpendicular direction is adjusted by the scan angle of scanner mirror 110, in a way fully detailed in application Serial No. 602,013 mentioned above. No description of the action of this mechanism is given herein, since the necessary disclosure of that earlier application is hereby incorporated to the extent necessary to an understanding of the present invention.

It is occasionally desirable, especially during adjustment of the amplifiers and other controls preliminary to making a reproduction of a new subject, to operate the cylinder 26 and carriage 28 without moving the copy table. Thus, one can make a test engraving or other test with a signal from a single selected spot of the material being copied. To permit this, a handle 118 (Fig. 3) operates a shaft 120 passing through the hollow axis of the clutch and brake assembly, to disengage a friction clutch 122 connected between the shaft of belt pulley 100 and the miter gears. Springs as indicated maintain this clutch disengaged when the handle 118 is raised to release the clutch. A manual scanner positioning wheel 124 permits the scanner to be positioned as desired when the clutch 122 is disengaged.

In general, the function of a screen generator in an optical half-tone reproducing system is to provide a basic pulsating or alternating signal which is modulated by the output of the electro-optical scanning system to actuate the transducer. Thus, in the case of engravings, the screen generator determines the number of strokes per unit of time the engraving stylus will make, while the modulating signal from the image scanning device determines the depth to which the engraving stylus penetrates the engraving plate. By proper correlation of the screen frequency and the rotational speed of the engraving plate cylinder, the number of dots per inch, or "screen," that is tooled upon the engraving plate is determined. The screen or number of dots per inch varies for different types of engraving work, and it is highly desirable that the screen frequency generator be capable of producing easily and with no complications any selected one of a plurality of desired screen frequencies.

The preferred form of screen generator referred to herein consists of a transparent or translucent tone wheel or disc upon which have been produced alternate opaque and relatively transparent spaces, the number of pairs of opaque and transparent spaces being related to the number of dots per inch required on the engraving plate. A number of rows of such markings are placed on the disc at different radial positions to correspond to a multiplicity of desired frequencies to be obtained. This disc is mounted for rotation between a light source and a photocell device to act as a light chopper. Interposed in the light beam adjacent the chopper disc is a relatively stationary mask having thereon alternate opaque and transparent spaces duplicating a section of those on a tone wheel. By means of this arrangement a relatively large number of "optical teeth," as the disc markings may sometimes be termed, are aligned or disaligned at the same instant, to achieve an integrating effect at the output of the light intensity sensitive device. Thus, at an instant when all the transparent portions of the chopper disc lying in the light beam are aligned with the corresponding transparent parts of the mask, a maximum amount of light reaches the photocell. When the chopper turns an amount equal to one space width, the minimum (usually zero) light reaches the cell. During the transition, any individual irregularity in the positions of the opaque and transparent portions will average out because several sets of opaque and transparent portions (or spokes) are included in the light beam. A more detailed description of this screen generator may be had by reference to the aforementioned copending Levine application (of which this application is a division), wherein like members bear the same reference numerals as appear in the drawings forming a part of the present application.

While the invention has been described herein in connection with certain preferred embodiments thereof, so that those skilled in the art can readily understand the novel features thereof, such examples are given by way of illustration only. Various changes in the specific details of the invention can be made without departing from the scope of the invention as defined in the appended claims.

What is claimed is:

1. In an image reproducing machine of the photoelectric scanner type, a drive shaft, a cylinder for receiving a sensitive sheet, said cylinder being coupled to said shaft for rotation thereby, a transducer carriage, means for slidably mounting said carriage for motion parallel to the axis of said cylinder, an oscillatable drive element, means driven by said drive shaft for oscillating said element through its cycle during each rotation of the drive shaft, means including a disengageable clutch coupling said oscillatable drive element to said carriage to move the same along its path, means including a selectively operable brake for restraining movement of the carriage, and means controlled by said drive shaft for selectively controlling said clutch and brake to provide intermittent progressive advance of said carriage along said cylinder during a predetermined portion only of the rotation thereof.

2. A carriage drive for an image reproducing machine, comprising a drive shaft, a sheet-receiving cylinder coupled to said shaft for rotation thereby, a carriage, means for slidably mounting said carriage for motion parallel to the axis of said cylinder, an oscillatable drive element, means controlled by said drive shaft for oscillating said element through its cycle during each rotation of the drive shaft, a disengageable clutch for coupling said drive element to said carriage to move the latter along its path, a selectively operable brake for restraining movement of the carriage, and means controlled by said drive shaft for selectively controlling said clutch and brake to provide intermittent progressive advance of said carriage during a predetermined portion of each rotation of said cylinder.

3. In an image reproducing machine of the photoelectric scanner type, a drive shaft, a cylinder for receiving a sensitive sheet, said cylinder being coupled to said shaft for continuous rotation thereby, a transducer carriage, means for slidably mounting said transducer carriage for motion parallel to the axis of said cylinder, means including an oscillatable drive element for moving said transducer carriage along a path parallel to the axis of said cylinder, means actuated by said drive shaft for oscillating said element through a cycle during each revolution of said drive shaft, means including a disengageable clutch for coupling said oscillatable drive element to said transducer carriage, means including a selectively operable brake for selectively operating said clutch and said brake to thereby produce intermittent motion of said transducer carriage, a copy support, means coupled to said transducer carriage drive means for intermittently moving said copy support in timed relationship with said transducer carriage, and means to adjust the increments of intermittent motion of said copy support.

4. The apparatus as set forth in claim 3, in which said clutch and brake are of the electromagnetically operated type, and in which the means actuated by said drive shaft includes cam operated switches for controlling said clutch and brake.

5. The apparatus as set forth in claim 3, in which the means to adjust the increments of intermittent motion of the copy support includes a pivoted link, and means for adjusting the position of the pivot to thereby change the throw of the link.

6. In an image reproducing machine of the photoelectric scanner type, a drive shaft, a cylinder for receiving a sensitive sheet, said cylinder being coupled to said shaft for rotation thereby, a transducer carriage, means for slidably mounting said carriage for motion parallel to the axis of said cylinder, an oscillatable drive element, means driven by said drive shaft for oscillating said element through its cycle during each revolution of said drive shaft, means including a disengageable clutch for coupling said oscillatable drive element to said carriage to move the same along its path, means including a selectively operable brake for restraining movement of the carriage, means controlled by said drive shaft for selectively controlling said clutch and brake to provide intermittent progressive advance of said carriage parallel to said cylinder during a predetermined portion only of the cylinder rotation, a copy support, means operated by said transducer carriage drive means for intermittently moving said copy support in timed relationship with said transducer carriage, and means to adjust the increments of intermittent motion of said copy support.

7. The apparatus as set forth in claim 6, in which the means to adjust the increments of intermittent motion of the copy support includes a pivoted link, and means for adjusting the position of the pivot to thereby change the throw of the link.

References Cited in the file of this patent

UNITED STATES PATENTS

| | | |
|---|---|---|
| 1,993,413 | Mellon | Mar. 5, 1935 |
| 2,574,872 | Jarvis | Nov. 13, 1951 |